United States Patent [19]

Gray

[11] Patent Number: 4,750,286

[45] Date of Patent: Jun. 14, 1988

[54] FISH CATCHING DEVICE

[76] Inventor: Norman L. Gray, 322 S. 6th St. Ter., Blue Springs, Mo. 64015

[21] Appl. No.: 7,773

[22] Filed: Jan. 28, 1987

[51] Int. Cl.$^4$ ............................................. A01K 91/06
[52] U.S. Cl. ........................................................ 43/15
[58] Field of Search ................................ 43/15, 16, 17

[56] References Cited

U.S. PATENT DOCUMENTS

| | | | |
|---|---|---|---|
| 2,714,270 | 8/1955 | Premo | 43/15 |
| 2,752,716 | 7/1956 | Porter | 43/16 |
| 3,017,715 | 1/1962 | Kennedy | 43/16 |
| 3,055,136 | 9/1962 | Scott et al. | 43/15 |
| 3,407,527 | 10/1968 | Hill | 43/15 |
| 3,412,499 | 11/1968 | Pastrovich | 43/15 |
| 3,562,947 | 2/1971 | Martin | 43/15 |
| 3,591,970 | 7/1971 | Davenport | 43/15 |
| 3,672,085 | 6/1972 | King | 43/15 |
| 3,897,646 | 8/1975 | Sheets | 43/15 |
| 3,973,346 | 8/1976 | Mason | 43/15 |
| 3,977,117 | 8/1976 | Zahner | 43/15 |
| 3,991,503 | 11/1976 | Lann | 43/15 |
| 4,031,651 | 6/1977 | Titze | 43/15 |
| 4,159,589 | 7/1979 | Pendergraft | 43/15 |
| 4,253,036 | 11/1980 | Dawson | 43/17 |
| 4,290,222 | 9/1981 | McLeod | 43/15 |
| 4,397,113 | 8/1983 | Pinson | 43/15 |
| 4,461,113 | 7/1984 | Erwin | 43/15 |
| 4,586,284 | 5/1986 | Westwood | 43/17 |
| 4,676,018 | 6/1987 | Kimball | 43/15 |

Primary Examiner—M. Jordan
Attorney, Agent, or Firm—Litman, McMahon & Brown

[57] ABSTRACT

An automatic fish catching device includes a support structure, a pole holding mechanism mounted near the top of the support structure and biased to place the pole in a generally vertical position, a triggering device which maintains the pole in a generally horizontal position and allows a fish to trigger the pole, an adjustment mechanism which allows the triggering device to be adjusted for the particular type of pole being used and for the type of fish to be caught and further allows adjustment of the tension necessary to overcome the triggering device, and an alarm mechanism which signals a fisherman that a fish has been caught. The pole is held down by the triggering mechanism until a fish pulls sufficiently on the triggering mechanism to release same at which time the pole is biased into a generally vertical position with a quick snap thereby pulling sharply the line associated wtih the pole and setting the hook on the line in the fish. An automatic positioning mechanism is provided to allow the fisherman to set the trigger mechanism using only a single hand. The device folds into a compact structure without disassembly for storage and travel.

17 Claims, 4 Drawing Sheets

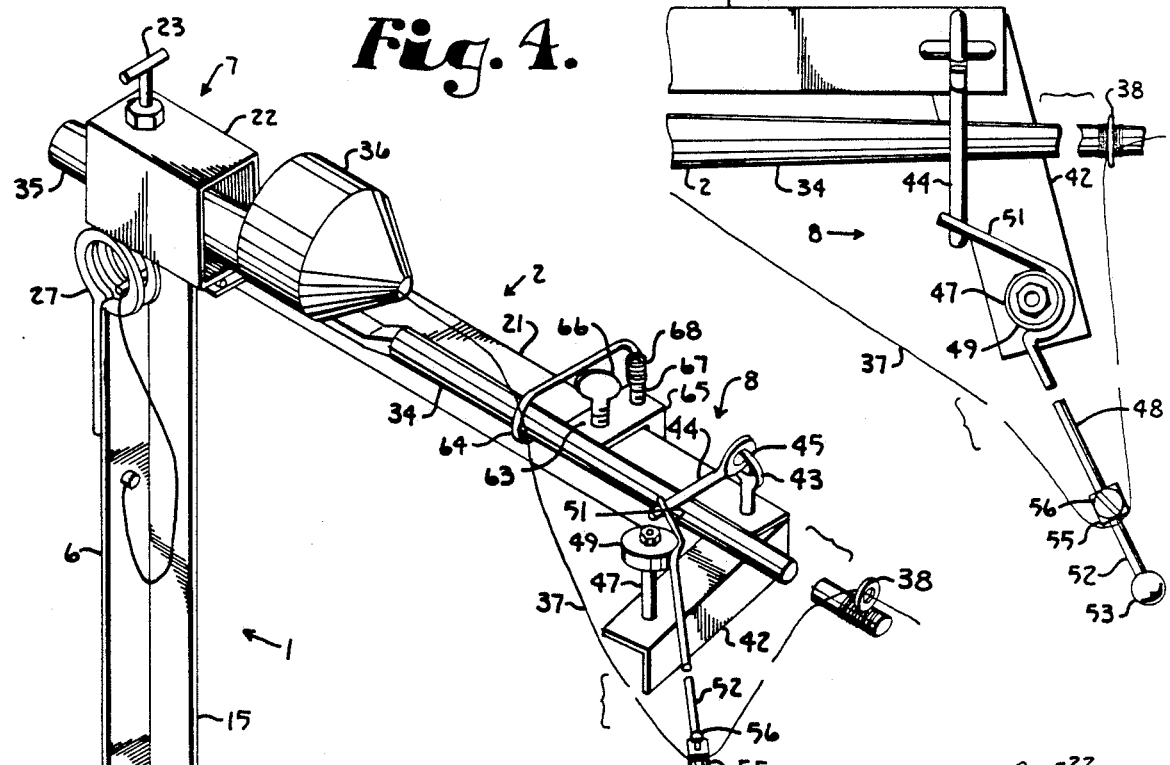
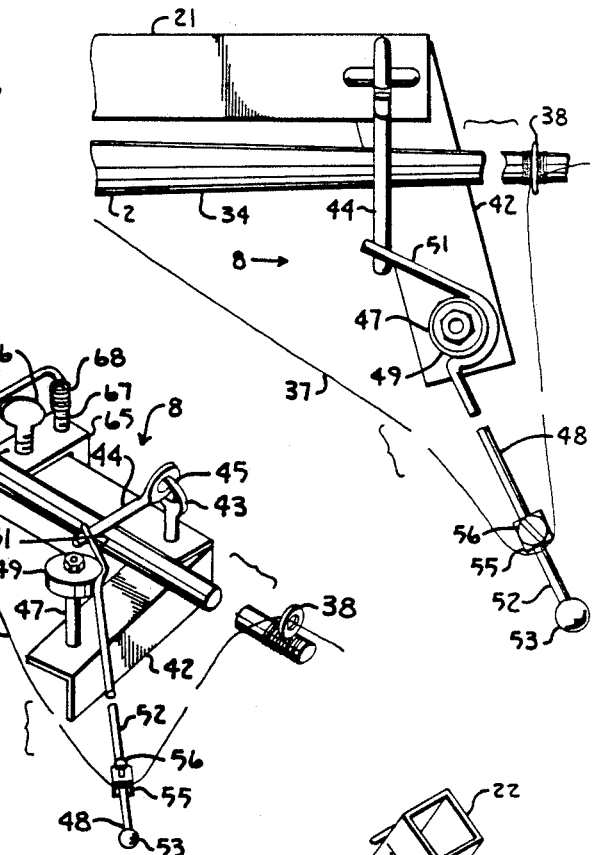
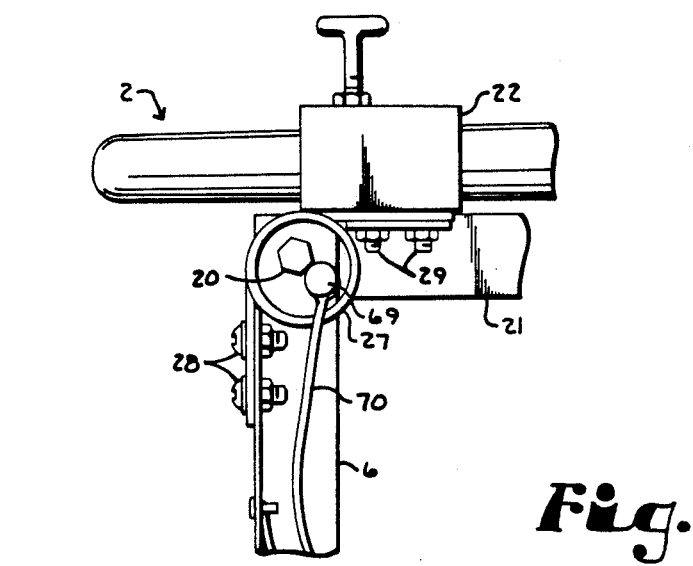

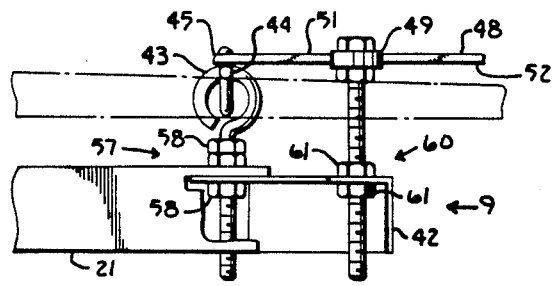
Fig.5.
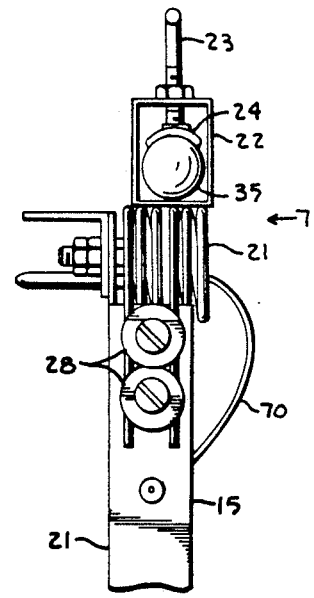
Fig.6.
Fig.2.
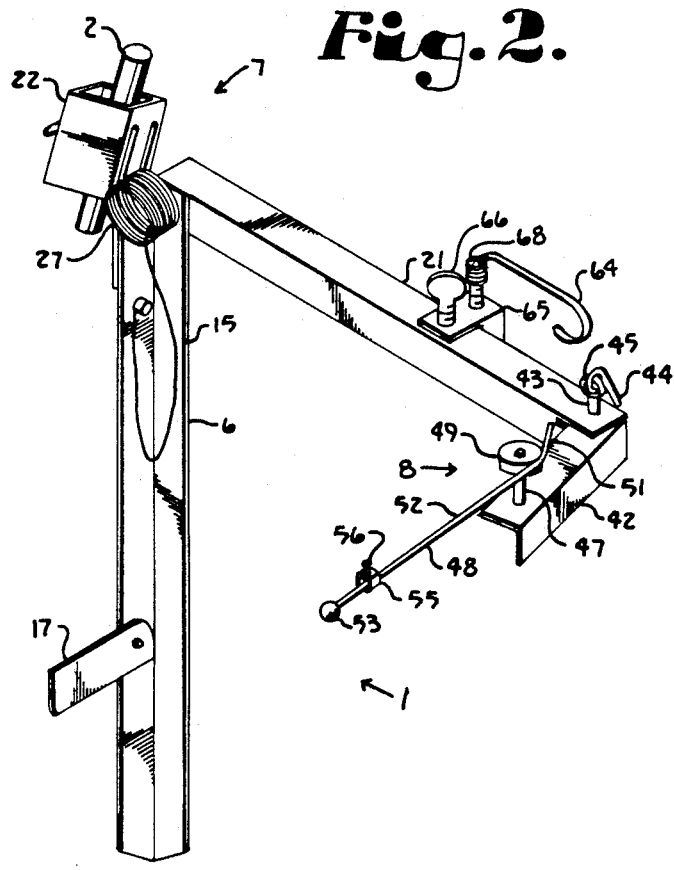

FISH CATCHING DEVICE

BACKGROUND OF THE INVENTION

The present invention relates to fish catching devices and in particular to such devices for use in conjunction with fishing poles which are designed to be preset and thereafter automatically catch a fish when triggered by a pull on the fishing line by a fish.

In many types of both commercial and sport fishing, fishermen place a line with a baited hook in the water and wait for long periods of time for a fish to take the bait. Many different prior art devices have been developed for allowing a fisherman to place a pole in a device which is preset and may be triggered by the fish taking the bait so as to suddenly pull on the pole and set the hook in the mouth of the fish, thereby catching the fish. For example, the Titze U.S. Pat. No. 4,031,651 illustrates such a device which has the built-in capacity to change the force applied to the pole when released by a trigger mechanism. The reasons why a fisherman would want such a device varies with the particular fisherman, for example, some fishermen want to tend many different lines at the same time, some fishermen want to rest or even leave while waiting for a fish to strike and other fishermen simply get tired of holding the pole.

One of the major problems with fish catching devices of the prior art has been that the triggering mechanism is not designed to easily accommodate various different size poles and different types of fish. In particular, for each type of fish, a particular tension is preferable on the line for catching the fish and a particular fish hook setting tension is also preferable. If a larger or smaller rod is utilized by a fisherman than the device was originally designed for, then it may change the tension characteristics necessary for the fish to trigger the device. If the fisherman is trying to catch large fish as opposed to small fish, it is desirable for the tension to be set higher and vice versa.

In addition, for certain fish, the strength of the pull on the line, when the device is triggered, is important. For example, when fishing for carp which have fairly weak mouth tissue, it is desirable that the tug on the line be just enough to set the hook and not pull the hook through the tissue. On the other hand, certain fish have fairly tough mouths and the pull required to set the hook is greater. Therefore, it is desirable to have a fishing device of this type which is adjustable not only for a particular pole but also for the size of the fish and for the type of fish which the fisherman is trying to catch.

Fishermen often accidentally trigger fishing devices of this type while they are being set. This often results in injury to the fishermen, since they may be leaning over the pole and have it strike them in the face. Therefore, applicant has foreseen the need for a safety mechanism to prevent the pole from striking a user in the face during operation.

Applicant has also found that one of the fisherman's hands is frequently busy holding the rod or doing some other function while the triggering device is being set. Consequently, it is beneficial to have a triggering system which can be set with a single hand.

Applicant has found that it is important that the fisherman be notified fairly quickly when the device is triggered. If the fisherman fails to respond soon, the fish may be able to disengage the hook or break the line, if the fish struggles for a long period of time. Therefore, applicant has devised several systems for notifying the fisherman that the device is triggered which include both audible signals for use during the daytime and/or light signals for use during the night. The light also provides the fisherman with the ability to better see the equipment.

In addition, applicant has found that it is important to have a device which collapses neatly into a compact structure for both carrying and storage. Further, applicant has found that, in a device of this type, it is important to be able to attach the device to either a boat or be planted in ground or fixed relative to ice for ice fishing. In addition, when the structure can be planted within the ground, it is important to have the ability to change the angle of the fishing rod relative to the structure planted in the ground, such that it can be easily used on a slanted bank or the like. Applicant has also found that it is important to provide structure for locking a fishing rod within the device so that the fishing rod is not accidentally lost when pulled on by a large fish or the like.

OBJECTS OF THE INVENTION

Therefore, the objects of the present invention are: to provide a fish catching device suitable for use with a fishing pole or the like and including a triggering device acting in cooperation with a biasing mechanism such that when a fish trips the triggering device, the biasing mechanism provides a sharp tug or pull to the line associated with the pole thereby setting a hook in the fish; to provide such a fishing device incorporating an adjustment mechanism to allow adjustment of the device to provide for different size rods, to provide for different weight fish and/or to provide for fish having different mouth characteristics; to provide such a fish catching device having a safety mechanism which prevents the rod from striking the fisherman in the face during setting of the fishing device and which also functions as a stop when it is desirable to catch fish requiring only a slight tug to set the hook in the mouth thereof; to provide such a mechanism which includes signal alarms, both audio and visual, to notify the fisherman that the device has been triggered by a fish; to provide such a device which is easily and quickly collapsible into a compact unit for storage and travel without disassembly; to provide such a device which can be set using a single hand of the fisherman; to provide such a device which incorporates mounting mechanism for attaching to a boat or mounting in the ground; to provide such a device which is adjustable to allow for placement on nonhorizontal surfaces; to provide such a device which includes a locking mechanism to secure the fishing pole to the device; and to provide such a device which is relatively simple to construct, easy to use and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a fish catching device in accordance with the present invention showing the device in a set configuration ready to catch fish.

FIG. 2 is a fragmentary view of the pole and the fish catching device on a reduced scale showing the fish catching device in a triggered state and the pole in an elevated position subsequent to having caught a fish.

FIG. 3 is an enlarged and fragmentary side elevational view of a hinge member for upright and horizontal sections of the fishing device and showing a spring biasing mechanism in conjunction with a cup for holding the fishing pole.

FIG. 4 is an enlarged and fragmentary top plan view of the fishing device showing the pole in conjunction with a triggering mechanism set in position to catch a fish.

FIG. 5 is a side elevational view of the fishing device showing the triggering mechanism in position to catch a fish and showing a fishing pole in phantom.

FIG. 6 is an enlarged and fragmentary rear view of the fishing device showing the hinge mechanism and spring biasing member and also showing the fishing pole in a set position.

FIG. 7 is a perspective view of the fishing device on a reduced scale showing the fishing device in a collapsed state.

DETAILED DESCRIPTION OF THE ILLUSTRATED EMBODIMENTS

Figure 9:
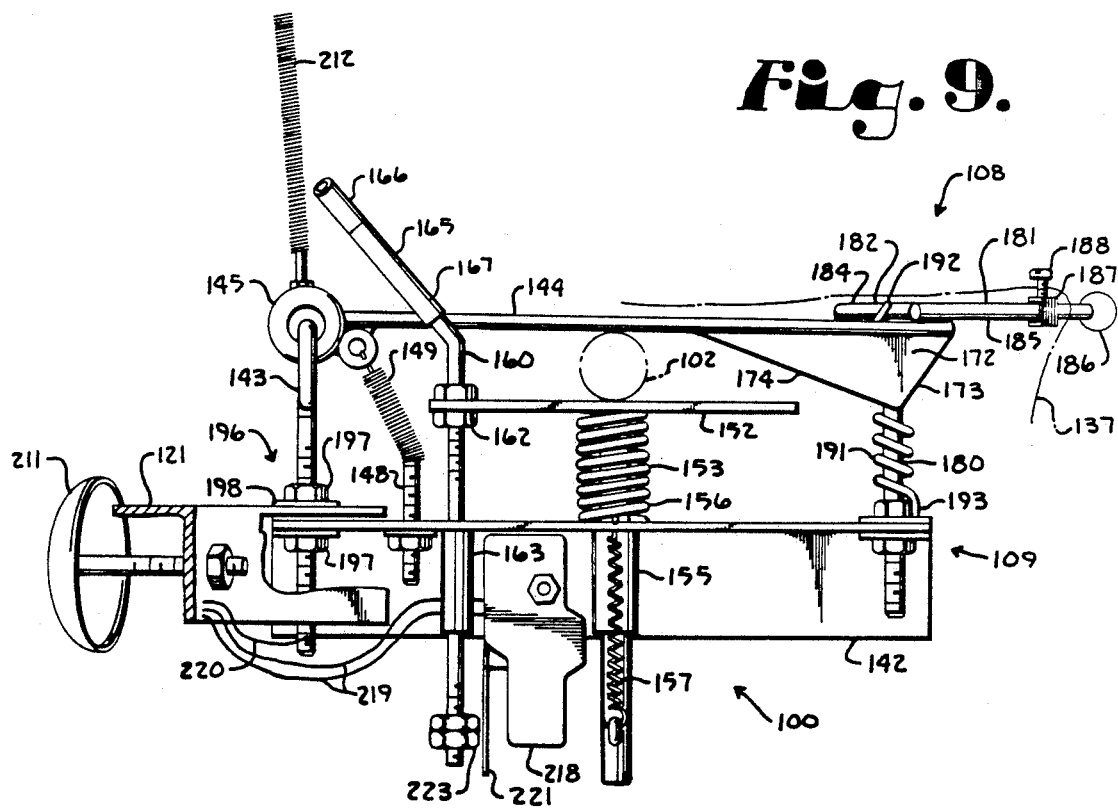
FIG. 9 is a side elevational view of a triggering mechanism of the fishing device showing the triggering mechanism and fishing pole in a set configuration, taken along line 9—9 of FIG. 8.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Illustrated in FIGS. 1 through 7 is a first embodiment of a fish catching device or fishing apparatus in accordance with the present invention which is generally designated by the reference numeral 1. The fishing device 1 is utilized in conjunction with a conventional fishing pole 2.

The fishing apparatus 1 comprises a support structure 6, a biased pole holding mechanism 7, a triggering means or mechanism 8 and adjustment member or mechanism 9.

The support structure 6 includes upright support means, which in the illustrated embodiment is generally vertical support post 15 having a lower spiked end 16 suitable for sinking into the ground and a collapsible footbar 17. The footbar 17 is swingable relative to the support post 15 from an outwardly projecting position such as shown in FIG. 2, to be used by a fisherman in driving the spiked end 16 into the ground, to a collapsed position such as shown in FIG. 7 wherein the footbar 17 is aligned parallel with the support post 15 and snugly positioned thereagainst.

The support structure 6 further includes a generally horizontal support member 21. The support member 21 and support post 15 are joined near the top of the support post 15 and the rearward end of the support member 21 by a bolt 20 or the like which allows pivotal movement between the support post 15 and support member 21, such that they can be aligned parallel to one another, as shown in FIG. 7, or aligned at right angles relative to one another, such as shown in FIG. 2. The illustrated post 15 and support member 21 are constructed of angular material, such as aluminum, plastic or iron. A pole receiving cup or box 22 is pivotably mounted relative to and near the top of the support post 15 so as to pivot through a generally vertical plane when the support post 15 is vertically planted. The fishing pole 2 is partially positioned within the box 22 and secured therein by a locking screw 23 which operatively biases a hold down plate 24, shown in FIG. 6, against the pole 2, when the screw 23 is tightened.

The box 22 is connected to the support post 15 by a hinge and spring mechanism 27 which normally biases the box 22 such that the fishing pole 2 is rotated about the mechanism 27 and urged into an elevated or generally vertical position, (normally about 15° off of vertical), also referred to herein as a triggered position. The hinge and spring mechanism 27 is attached to the support post 15 by connecting bolts 28 and is attached to the box 22 by connecting bolts 29. When the pole 2 is positioned in a generally horizontal position and the support post 15 is in a generally vertical position, such as shown in FIG. 3, the hinge and spring mechanism 27 exerts a biasing force against the box 22 to try to urge the box 22 into the triggered position shown in FIG. 2.

The fishing pole 2 includes an elongate rod 34 having a handle 35 which is positioned within the box 22, a reel 36, fishing line 37 passing along the rod 34 and being fed from the reel 36 and grommets 38 for guiding the fishing line 37 along the rod 34.

The triggering mechanism 8 includes a swingable positioning plate 42 which is attached near one end thereof to the forward end of the horizontal support member 21. The plate 42 can be swung through a wide arc in a horizontal plane when the support member 21 is horizontally aligned. During normal operation of the device 1, the plate 42 is positioned at an angle of about 70° to 75° relative to the support member 21 such that the unattached outer end of the plate 42 is slightly forward of the front end of the support member 21, such as seen in FIG. 4. The plate 42 is also swingable to a position such as is shown in FIG. 7 wherein the plate 42 is aligned parallel with and snugly against the support member 21. Near the forward end of the support member 21 and effectively securing the positioning plate 42 to the support member 21 is an upright eyebolt 43. The eyebolt 43 extends above the positioning plate 42 and is in turn connected to a constraining bar 44 such that the constraining bar 44 is free to pivot about a connection 45 with the eyebolt 43. It is foreseen that the plate 42 could be pivotally connected to the member 21 at a location other than near an end and, in particular, could be connected near the center thereof to the member 21 with the eyebolt 43 attached at a location on the plate 42 spaced from the connection with the member 21.

The triggering mechanism 8 further includes an upright trigger support 47 which is secured to an outer end of the positioning plate 44 opposite the upright eyebolt 43. Mounted on the top of the trigger support 47 is a trip lever 48 pivotably mounted on the support 47 by a bearing mounting 49. The bearing mounting 49 is a relatively low friction ball bearing which allows substantially friction-free movement of the trip lever 48 about the trigger support 47. The trip lever 48 is an elongate rod medially curved about and attached to the bearing mounting 49 and extending outwardly on both sides thereof so as to form a constraining bar engaging segment 51 and an outward segment 52. Near the outer end of the outward segment 52 is a protective ball 53 to help avoid injury to a user and to help prevent the line 37 from being blown off the end of the trigger outward segment 52 while in the set position.

The adjustment mechanism 9 includes a tension adjustment slide 55 having a locking screw 56 thereon which is mounted on the trip pivotable lever outer segment 52 and which is lockable in a selected position along the outward segment 52 by the screw 56. In normal operation, the line 37 is effectively looped or draped over and held in place along the outward segment 52 by the slide 55. In windy conditions, the slide 55 works in cooperation with the ball 53 to prevent the line 37 from being blown off the trip lever 48, while in the set position. The position of the slide 55 along the outward segment 52 partially determines the tension on the line 37 necessary to trigger the device 1. In particular, as the slide 55 is moved outward along the outward segment 52, less tension is normally required on the line 37 to trigger the device 1 and vice versa. The distances of the slide 55 from the rod 34 determines how much slack must be taken up in the line 37 upon triggering of the device before a sharp pull is experienced at the hook. The outward segment 52 can be bent relative to the rod 34 to adjust this distance. For large tough mouth fish, the slide 55 should be positioned near the rod 34 and for small or weak mouth fish, the slide 55 should be spaced relatively further from the rod 34.

The adjustment mechanism 9 further includes a vertical adjustment means associated with eyebolt 43 at location indicated by the reference numeral 57 and, as illustrated, includes the nuts 58 which may be manipulated along the eyebolt 43 which is threaded so as to adjust the height of the eyebolt 43 relative to the plate 42. The upright trigger support 47 also includes means for adjusting the height of the top of the upright support 47 relative to the plate 42 which is generally designated by the reference numeral 60 and, as illustrated, includes the nut 61 which may be manipulated to vary the height of the upright trigger support 47 which is threaded relative to the plate 42.

A hold down mechanism 63 is provided for preventing the rod 34 and consequently the fishing pole 2 from swinging into a fully vertical position when a hook 64 of the mechanism 63 is positioned around the rod 34, as shown in FIG. 4. The hold down mechanism 63 is secured to the support member 21 by a slide base 65 wrapping about part of the member 21 and held thereto by a thumb screw 66 and may be positioned at different locations along the support member 21 and spaced horizontally from the location shown in the illustrated embodiment. The mechanism 63 includes a threaded post 67 mounted on the slide base 65 so as to be vertically adjustable and a spring connecting the post 67 with the hook 64. The hold down mechanism 63 allows the fishing pole 2 to rise only partially when the triggering mechanism 8 is triggered. This prevents the fishing pole 2 from injuring the fisherman, if the triggering mechanism 8 is accidentally triggered during setting procedure or allows the apparatus 1 to be used in conjunction with fish having weak mouths such that too strong a pull or tug is not exerted against the line 37 which would consequently rip a hook from a weak mouth fish. As the hold down mechanism 63 is positioned closer to eyebolt 43 and the post 67 is shortened relative to the base 65, then the weaker will be the pull on the line 37. The spring 68 helps to dampen the sharp engagement of the rod 34 with the hook triggering.

The fishing apparatus 1 includes a locking pin 64 which is positioned near but spaced from the pivotable bolt 20 and which is adapted to pass through openings in both the vertical support post 15 and horizontal support member 21 so as to lock the support member 21 and support post 15 in the position shown in FIG. 3. The pin 69 may be withdrawn from a locking position, as shown in FIG. 3, such that the support member 21 and support post 15 fold relative to one another, such as shown in FIG. 7, and, thereafter, the pin 69 is inserted in another set of openings passing through the support member 21 and support post 15 so as to prevent relative movement therebetween. The pin 69 is attached to the support post 15 by a keeper chain 70 which is wound about the post 15, member 21 and trip lever 48 when folded for carrying, as in FIG. 7

In use, when the fisherman desires to utilize the fishing apparatus 1, the device is unfolded and configured such as in FIG. 2. The support post spiked end 16 is driven into the ground by stepping on the foot bar 17 and the locking pin 69 is positioned so as to lock the support member 21 at a generally right angle to the support post 15. The fishing pole 2 is positioned within the box 22 and the locking screw 23 is tightened so as to secure the fishing pole 2 within the box 22. The fishing pole 2 is at this time in an upward or triggered position. The pole 2 is thereafter pushed by the fisherman into a parallel alignment with the support member 21 and the hold down mechanism hook 64 is placed over the pole 2 to prevent injury to the fisherman. The constraining bar 44 is thereafter positioned at virtually a 90° angle to the support member 21 over the pole 2 and is positioned beneath the trip lever engaging segment 51. During this process, the plate 42 is swung relative to the support member 21 so as to position the end of the constraining bar 44 at a location spaced from the bearing mounting 49 along the engaging segment 51. The line 37 is looped or draped over the trip lever 48 so as to rest against the slide 55 on the outermost side of the slide 55. At this time, the hold down mechanism 64 may be removed from the rod 2 or left in place depending on the type of fishing to be done. The fishing apparatus 1 is in a set position and ready to catch a fish, as shown in FIG. 1.

It is noted that prior to use of the apparatus 1, the triggering mechanism 8 is adjusted for the particular rod 34 to be utilized and for the particular fish to be caught. In particular, the slide 55 is positioned along the outward segment 52 at a location deemed best for the type of fish to be caught and/or the trip lever 48 is bent to readjust the distance of the slide 55 from the rod 34. Normally, the further out the slide 55 is positioned on the outward segment 52, the larger the fish. As shown in FIG. 5, the relative heights of the upright trigger support 47 and upright eyebolt 43 are adjusted such that the constraining bar 44 is preferentially angled relative to a horizontal plane for the particular rod being utilized and for the particular fish to be caught. If the constraining bar 44 is angled upward from the eyebolt 43 to the engaging segment 51, then it will be more difficult for the fish to trigger the device. A low friction coating may be used where the segment 51 engages the constraining bar 44 when small fish are to be caught.

In addition, the larger the rod 34, the greater the space necessary between the constraining bar 44 and the plate 42. Consequently, the height of the upright eyebolt 43 and upright trigger support 47 relative to the plate 42 are adjusted prior to fishing by manipulation of the nuts 58 and 61 to position the constraining bar 44 level or horizontal, but with sufficient height between the plate 42 and constraining bar 44 to allow passage of the rod 34 therebetween. The upright trigger support 47 is then either slightly raised so that the constraining bar 44 slopes upward toward the trigger support 47, if it is desired to catch larger fish, since it will take more strength for the fish to trip the apparatus 1, or alternatively the trigger support 47 is slightly lowered so that the constraining bar 44 slants downward toward the trigger support 47 when the fisherman is trying to catch smaller fish which would be able to exert less force on the line 37 to trip the trigger mechanism 8. In addition, the mechanism 63 may be utilized to act as a stop for the rod 34 so as to prevent too much of a quick pull being placed on weak mouth and/or small fish. The mechanism 63 is positioned favorably along the support member 21 and the post 67 is adjusted as needed. Spring tension, pole size, tripping pressure and type of fish to be caught all interreact such that modification of the adjustment mechanism 9, to account for a change in one of these parameters, may require other changes also to prevent another desired parameter from changing.

When a fish pulls on the bait and consequently the line 37, the line 37 is urged against the slide 55 and biases the trip lever outward segment 52 toward the rod 34 which in turn rotates the engaging segment 51 from covering relation over the constraining bar 44 and allows the constraining bar 44 to rotate about its connection with the eyebolt 43. The fishing pole 2 is thereafter biased upward by the hinge and spring mechanism 27 to either a first position where it is held by the hold down mechanism hook 64 or to a fully almost vertical upright and triggered position, such as shown in FIG. 2. The fisherman then takes control of the rod 34 by loosening the screw 23 and removing the handle 35 from the box 22 and reels in the fish after which the process can be reinitiated. After use, the apparatus 1 can be refolded into the compact configuration shown in FIG. 7 wherein the support post 15, support member 21, plate 42 and pivotal lever 48 are commonly aligned parallel and the support member 21 and support post 15 are held together in side-byside relationship by pin 69 and further are constrained from movement relative to one another by the chain 70.

Shown in FIGS. 8 through 11 is a modified embodiment of a fishing apparatus in accordance with the present invention generally designated by the reference numeral 100 shown in conjunction with a fishing pole 101.

The fishing apparatus 100 is similar to the fishing apparatus of the previous embodiment in certain respects and similar features will not be emphasized herein, but rather the differences between the two embodiments will be discussed. The fishing apparatus 100 comprises a support structure 106, a biased pole holding mechanism 107, triggering means or mechanism 108, an adjustment mechanism 109 and an alarm mechanism 110.

The support structure 106 includes a support member 115 which is normally vertically aligned during usage, when the apparatus 100 is positioned on a rather flat surface. The illustrated apparatus 100 is provided with a lower spiked end which is illustrated as being impaled in the earth. Also attached to the support member 115 is an alternative clamp 117 for allowing attachment of the apparatus 100 to the side of a boat or the like. The clamp 117 includes a tightening screw 118.

The support structure 106 further includes a support bar 121 which is attached near a rearward end thereof to an upper end of the support member 115 by a pivotable bolt 122. A plurality of apertures 123 are provided at a common radius from the bolt 122 in both the support member 115 and the support bar 121. A locking pin is utilized to secure the support bar 121 in a fixed position relative to the support member 115. Normally, the support bar 121 is at approximately a right angle to the support member 115, when the apparatus 100 is utilized on a rather flat surface, but the various alternative positions of the apertures 123 for use in conjunction with the locking pin 124 allows for modifying the angle of the support bar 121 relative to the support member 115, so that the apparatus 100 can be utilized on non-horizontal surfaces, such as steep river banks, yet the support bar 121 can be maintained in a generally horizontal alignment. It is foreseen that a protractor device could be attached to the support member 115 and cooperate with a similar device on the bar 121 and a pin to provide for angle adjustment.

The biased pole holding mechanism 107 includes a pole holding cup 127 mounted near the upper end of the support member 115 by a hinge 128 which allows the cup 127 to rotate relative to the top of the support member 115 in a plane generally passing through the support member 115 and support bar 121. The cup 127 is further connected to the support member 115 by a tension spring 129 which biases the end of the cup 127 opposite the hinge 128 toward the support member 115. The spring 129 is connected to the cup 127 at a location designated by the reference numeral 130 and to the support member 115 at a location generally designated by the reference numeral 131. Numerous attachment locations for spring 129 are provided along post 115 spaced vertically from location 131 to allow a change in the tension of the spring 129 or to adjust for a change in the angle of bar 121 relative to support member 115 to retain the same tension in spring 129. It is also foreseen that the hinge 128 and bolt 122 could be replaced by a single 3-way hinge, that is a hinge with three plate elements attached respectively to the bar 121, cup 127 and support member 115 and being pivotal about a common pin. Other types of locking mechanisms besides pin 124 may be utilized to lock the bar 121 relative to the support member 115, including a spring loaded sliding bar secured to either the support member 115 or bar 121 and mating with a receiving cup in the opposite.

Figure 8:
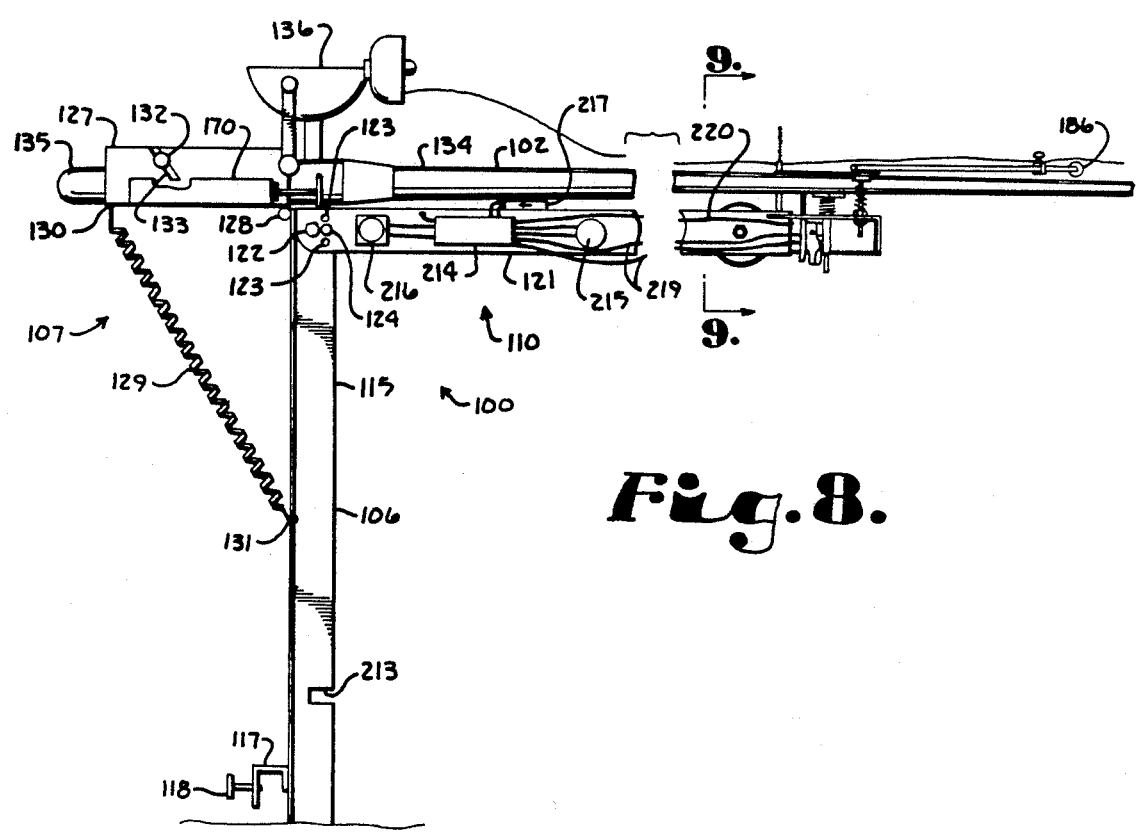
FIG. 8 is a side elevational view of a modified fishing device in accordance with the present invention in conjunction with a fishing pole and showing the fishing device in a set condition.

In the present embodiment the spring 129 provides the biasing force which is utilized to set a fishing hook associated with the fishing pole 101 in a fish by sharply rotating the outer end of the fishing pole 101 upwards which, in turn, pulls on the line 137 and subsequently the hook so as to set the hook in the mouth of a fish, thereby hopefully catching the fish. It is foreseen that different strength tension springs may be utilized for different types of fish and/or the spring 129 may be positioned at spaced locations along the support member 115, as described above, so as to provide more or less tension as needed for a particular type of fish. The cup 127 also includes a slide bar 132 which is mounted in a slide receiver 133. When the fishing rod is in a set configuration, such as is shown in FIG. 8, the slide bar 132 is drawn by gravity against the fishing pole 101 so as to hold the fishing pole 101 in the cup 127 and prevent a large fish from accidentally drawing the pole out into the water. When the pole 101 is in a triggered position, gravity again pulls the slide bar down and away from the fishing pole 101 so as to release it and allow a fisherman to remove and easily manipulate the pole 102.

The fishing pole 102 includes a rod 134 having a handle 135 and a reel 136 from which fishing line 137 is fed along the rod 134.

Swingably connected to the support bar 121 near a forward end thereof opposite the support member 115 is a positioning plate 142. The positioning plate 142 is secured to the member 115 by an upright eyebolt 143 and is rotatable within a generally horizontal plane when the support bar 121 is horizontally aligned. Pivotably connected to the upright eyebolt 143 near an upper end thereof is a constraining bar 144 joined to the eyebolt 143 at juncture 145. A connection post 148 is attached to the positioning plate 142 somewhat spaced from the eyebolt 143 and is attached at an upper end thereof to a tension spring 149 which spring 149 is also attached at an opposite end thereof to the constraining bar 144 to bias it toward the positioning plate 142.

Figure 10:
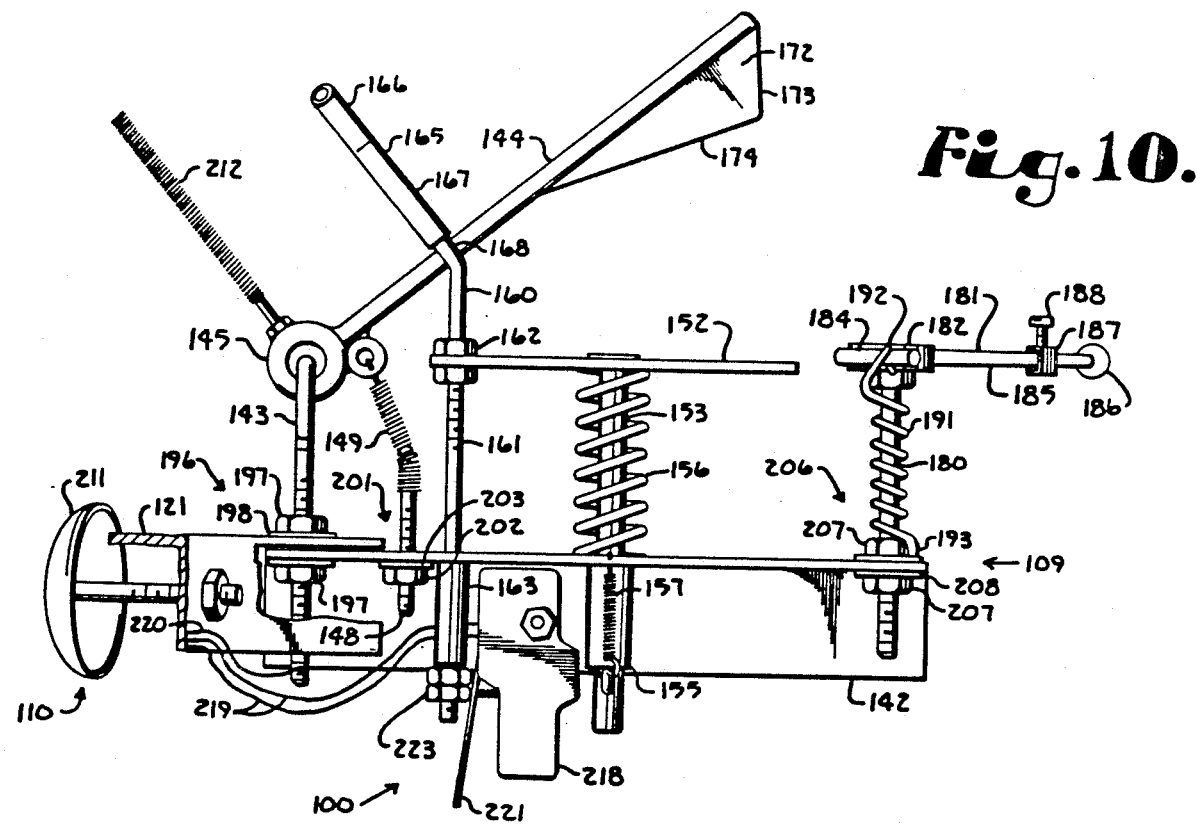
FIG. 10 is an enlarged side elevational view of the fishing device similar to FIG. 9 except showing the triggering mechanism in a triggered configuration.

The triggering mechanism further includes a fishing rod support plate 152 medially mounted on a support shaft 153 which passes through the positioning plate 142 near the middle thereof and also passes through a support sleeve 155 attached to the positioning plate 142 so as to provide support to the shaft 153. A comparatively high force compression spring 156 is positioned between the support plate 152 and the positioning plate 142 so as to urge the support plate 152 upwardly. A relatively low force tension spring 157 is attached to a lower end of the shaft 153 and to the positioning plate 142 to urge the support plate 152 toward the positioning plate 142 such that the support plate 152 is positioned approximately at the outer limit of extension of the compression spring 156 when the fishing apparatus 100 is in a triggered configuration, such as is shown in FIG. 10.

A guide 160 comprises an elongate stem 161 which passes through the end of the support plate 152 nearest the eyebolt 143 and through the positioning plate 142. The stem 161 is fixedly connected to the support plate 152 at the location generally designated by the reference numeral 162 by a pair of nuts mounted on the threaded stem 161 which allow the upper part of the stem 161 to be adjusted relative to the support plate 152. The stem 161 also passes through a guide sleeve 163 secured to the bottom of the positioning plate 142.

Figure 11:
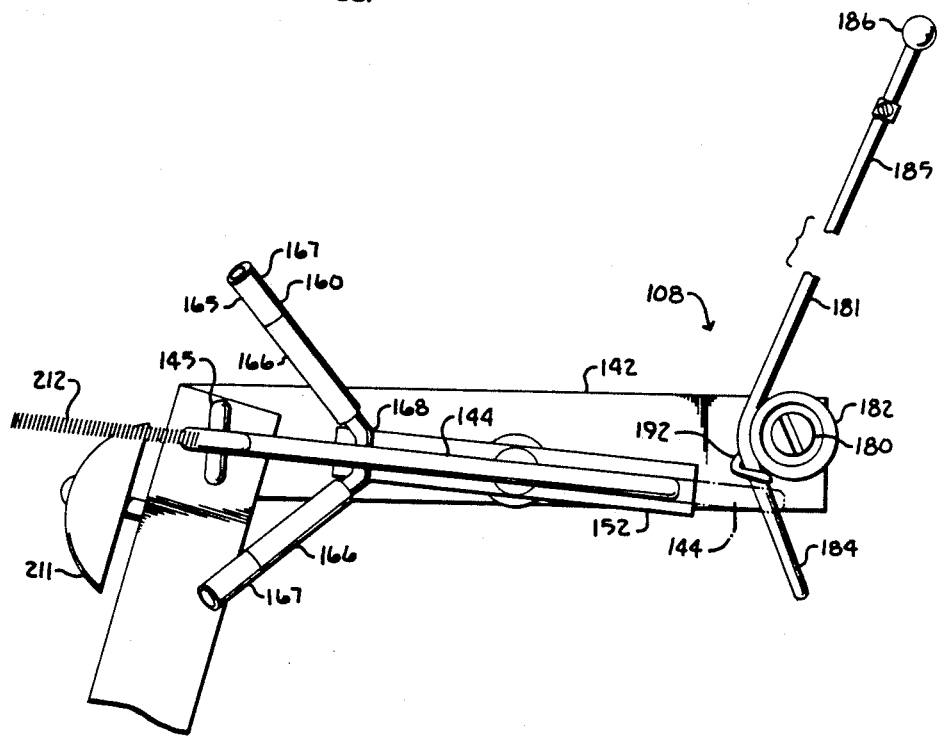
FIG. 11 is an enlarged and fragmentary top plan view of the fishing device showing the triggering mechanism in a triggered condition and showing a restraining bar of the triggering mechanism in phantom in a set configuration.

Near an upper end of the guide 160 is a constraining bar receiver 165 including arms 166 which are generally configured in a V-shape, as seen from the top in FIG. 11. The upper ends of the arms 166 are covered with insulators 167, but the lower ends of the arms 166 are free from insulation. The arms 166 join together in a constraining bar notch 168. The notch 168 is spaced from the constraining bar 144 when the triggering mechanism 108 is in a set configuration, such that no uninsulated part of the guide 160 engages the constraining bar 144 when in such a set configuration. The lower end of the stem 161 is also threaded.

Attached to the cup 127 is a telescoping unit 170 shown in a collapsed position in FIG. 8. The telescoping unit has a forked end which passes under the rod 134 near an outer end thereof when needed for extra rigidity where the rod 134 is flimsy. The telescoping unit 170 is extendable past the constraining bar 144 to function as a fishing pole for ice fishing or the like.

Near the free end of the constraining bar 144 and opposite the eyebolt 143 is a positioning flag 172. The flag 172 depends downwardly from the constraining bar 144 and includes an outer lower edge 173 and an inner lower edge 174. The outer edge 173 is at an angle of approximately 45° to the constraining bar 144 whereas the inner edge 174 is at a much more shallow angle relative to the constraining bar 144.

The triggering mechanism 108 further includes an upright trigger support post 180 which is mounted near an outer edge of the positioning plate 142 opposite the eyebolt 143. Mounted at the top of the support post 180 is a pivotable trip lever 181 which is secured to the post 180 by a low friction ball bearing mounting 182 so as to rotate in a generally horizontal plane when the positioning plate 142 is horizontally aligned. The trip lever 181 includes a first bar engaging segment 184 on one side of the bearing mounting 182 and a second line engaging segment 185 on an opposite side of the mounting 182. The illustrated segments 184 and 185 are bent at an angle of approximately 45° relative to one another, although this angle is variable for the type of fishing, and the line engaging segment 185 is substantially longer than the segment 184. A lesser angle than 45° would allow less line 137 to be taken up when triggering so that a greater pull would be applied to the line 137. Positioned along the line engaging segment 185 is a slide 187 having a locking screw 188. The slide 187 may be positioned anywhere along the line engaging segment 185. Located at the outer end of the segment 185 is a protecting ball 186.

A positioning spring 191 is wrapped about the post 180 and has an upper end 192 which is secured about the bar engaging segment 184 and a lower end 193 which is connected to the positioning plate 142, but electrically isolated from the plate 142. The positioning spring 191 urges the trip lever 181 into a predetermined position which is shown in FIG. 11.

The adjustment mechanism 109 includes an adjustable fastener generally designated by the reference numeral 196 securing and positioning the threaded eyebolt 143 to the support bar 121 and the plate 142. As illustrated, the adjustable fastener 196 comprises a pair of nuts 197 and an insulator 198 which separates the nuts 197 and eyebolt 143 from the support bar 121 and the positioning plate 142. The adjustment mechanism 109 further includes an adjustable fastener 201 for the connection post 148 and in particular includes a nut 202 mounted upon the post 148 which is threaded and an insulator 203 which electrically isolates the post 148 from the positioning plate 142. In addition, the adjustment mechanism 109 includes an adjustable fastener generally designated by the reference numeral 206 for the support post 180 and specifically including the nuts 207 mounted on the post 180 which is threaded and on opposite sides of the positioning plate 142 to allow vertical adjustment of the post 180 relative to the plate 142. An insulator 208 is positioned between the nuts 207 and the post 180 so as to electrically insulate the positioning plate 142 from the post 180 and spring 191.

The alarm mechanism 110 comprises a bell 211 attached to and extending outwardly from the support bar 121. A bell ringer 212 is mounted on and extends generally at a 90° angle from the constraining bar 144. The bell ringer 212 is positioned so as to strike the bell 211 when the fishing apparatus 100 is first triggered due to momentum of the constraining bar 144 produced by the pole 102 swinging therepast. After triggering, the constraining bar 144 is urged to return to the position shown in FIG. 10 by the spring 149. A notch 213 is located in the support member 115 to allow the member 115 to be folded parallel to the bar 121 with the support member for the bell 211 being positioned in the notch 213.

An electrical power supply 214 is provided along and grounded to the support bar 121. Electrically connected to the power supply 214 is a light 215, an audio source 216, such as a beeper or horn and a switch 217. The switch 217 may be selectively manipulated by an operator to activate the light 215 and/or the audio source 216 or be turned off. A second switch 218 is mounted on the positioning plate 142 and has wire leads 219 extending therefrom to the power supply 214 and switch 217. A wire lead 220 is also attached at one end thereof to the eyebolt 143 and to the opposite end thereof to the power supply 214. A trigger 221 is located on the switch 218 and a trigger engaging lug 223 formed by a pair of nuts threadably mounted on the stem 161 is located at a lower end of the guide stem 161 such that as the guide stem 161 is lowered, the trigger 221 is depressed and the switch 218 is turned off. When the stem 161 is raised, such as is shown in FIG. 10 and such as occurs when the apparatus 100 is in a triggered configuration, the switch trigger 221 is undepressed and the switch 218 signals the power supply 214 to initiate a light or audio signal depending upon the mode preselected by the fisherman on switch 217. In addition, in the triggered configuration, the constraining bar 144 electrically contacts the bar guide notch 168 such that a circuit is completed with the switch 217 through the previously mentioned ground and the wire 220. When in set configuration, the insulators 198, 203 and 208 prevent completion of this circuit, since the bar 144 does not electrically contact the guide 160.

In use, the fishing apparatus 100 is somewhat similar to the fishing apparatus 1. It is placed in operational readiness in a manner as described before for the previous embodiment except that the multiple apertures 123 allow a fisherman to select a range of angular alignment between the support member 115 and support bar 121. It is foreseen that more apertures 123 may be utilized to provide an even greater range. The adjustment mechanism 109 is manipulated by movement of the nuts 162, 197, 202, and 207 relative to the guide stem 161, eyebolt 143, post 148, and post 180 respectively so as to provide for a variance in the size of the pole 101 and to provide for a variance in the size of the fish to be caught in a manner such as has been described for the previous embodiment.

The fishing rod 101 is then pulled downwardly by pushing against the tensile force in the spring 129 until the rod 134 is generally parallel to the support bar 121. The fisherman uses one hand to push down on the rod 134 while utilizing the opposite hand to place the bar 144 over the rod 134 which is then pushed down freeing the opposite hand to maintain the line 137 free while setting the mechanism 108. Setting the triggering mechanism 108 is accomplished by first ensuring the rod 134 is placed in a generally central location on top of the support plate 152, such as is shown in FIG. 9. The fisherman then pushes further downwardly on the constraining bar 144 until the flag outer edge 173 engages the trigger lever bar engaging segment 184 which is subsequently pushed or biased outwardly by the flag 172 to allow passage of the constraining bar 144 therepast. The constraining bar 144 is pushed slightly below the segment 184 and the positioning spring 191 automatically biases the trip lever 181 back to its predetermined standard position such that the bar engaging section 184 is now positioned over the constraining bar 144. The constraining bar is then released and allowed to be pushed upwardly by the force of the compression spring 156 so as to engage the trip lever segment 184 and subsequently be in a set position. In the set position, which is illustrated in FIG. 9, the constraining bar 144 does not engage the guide stem 161 so as to make electrical contact therewith, however, in the triggered position, such as is shown in FIG. 10, the constraining bar 144 does engage the guide stem 161. In this manner, the electrical circuit through wire 220 is completed which activates the audio device 216 and/or light 215 through the switch 217 when preset to do so. When the constraining bar 144 releases the pole 102, the spring 129 pivots the pole 102 about the hinge 128 such that the end of the pole 102 rotates upward quickly, thereby pulling sharply on the line 137 and setting a hook attached to the line in a fish. The light 215 may be alternatively activated by the switch 217 anytime by the fisherman to serve as a safety device or flashlight at night.

It is foreseen that the fishing pole 102 of the illustrated embodiments could be replaced by a reelless pole for use in ice fishing or the like or that the telescoping support 170 could be utilized as such a pole. It is also foreseen that multiple apparati such as 1 or 100 could be mounted on and diverge at different angles from a single support post to allow a fisherman to use multiple fishing poles simultaneously.

It is to be understood that while certain forms of the present invention have been illustrated and described herein, it is not to be limited to the specific forms or arrangement of parts described and shown.

What is claimed and desired to be secured by Letters Patent is as follows:

1. In a fishing device including a support structure for holding a fishing pole with a fishing line in a set configuration and a triggered configuration and further including biasing means urging the pole from the set configuration to the triggered configuration but being restrained by a trigger mechanism until the triggering mechanism is tripped and further wherein the triggering mechanism includes a restraining bar, held in covering relation to the pole when in the set configuration, by a trigger lever engaging the restraining bar at one end thereof and said lever being rotatable by pressure exerted on an opposite end thereof by a fish pulling on the fishing line looped over said lever so as to rotate to a triggered position whereupon the lever no longer covers the restraining bar so as to release the bar and allow the pole to swing to the triggered configuration; the improvement wherein said device includes:
 (a) a first support post member pivotally attached to said restraining bar,
 (b) a second post member supporting and allowing rotation of said trigger lever; and (c) adjustment means allowing the tension required to rotate said lever to be modified; said adjustment means comprising height modification means to allow adjustment of relative heights of said first and second posts such that the point of location of the attachment of said restraining bar to said first post and the point of location of support of said trigger lever by said second post are variable relative to one another such that inclination of said restraining bar relative to said trigger lever is variable, thereby allowing for a variance in the tension required to trigger said device.

2. The device according to claim 1 wherein:
(a) said trigger lever is connected to said second post member by a relatively low friction ball bearing mounting allowing rotating in a horizontal plane when said device is operational.

3. The device according to claim 2 wherein:
(a) said adjustment means comprises a slide on said trigger lever adapted for receiving the fishing line looped thereover; said slide being selectively positionable along said trigger lever so as to modify the leverage required to rotate said trigger lever relative to said restraining bar.

4. The device according to claim 1 including:
(a) an elongate support member aligned parallel with the pole when said device is in the set configuration thereof; and
(b) said elongate member having mounted thereon a hook mechanism adapted to be selectively positioned in securing relationship over the pole for protection of the user and for functioning as a stop to limit upward movement of the pole.

5. The device according to claim 1 including:
(a) an elongate support post;
(b) a support member aligned generally parallel to said pole when said device is in the set configuration; and
(c) angle adjustment and locking means between said post and said support member to allow angular adjustment of said support member relative to said post such that said support member may be maintained in a generally horizontal aligned configuration while said post may be positioned in a vertical alignment or in a variety of non-vertical alignments.

6. The device according to claim 1 including:
(a) a telescoping mechanism pivotally connected to said device and near whereat said device is adapted to hold a handle of said pole and being extendable therefrom and including means thereon to attach to a pole to provide rigidity thereto or to alternatively function as a pole.

7. In a fishing device including a support structure for holding a fishing pole with a fishing line in a set configuration and a triggered configuration and further including biasing means urging the pole from the set configuration to the triggered configuration but being restrained by a triggering mechanism until the triggering mechanism is tripped and further wherein the triggering mechanism includes a restraining bar, held in covering relation to the pole when in the set configuration, by a trigger lever engaging the restraining bar at one end thereof and said lever being rotatable by pressure exerted on an opposite end thereof by a fish pulling on the fishing line looped over said lever so as to rotate to a triggered position whereupon the lever no longer covers the restraining bar so as to release the bar and allow the pole to swing to the triggered configuration; the improvement wherein:
(a) said restraining bar includes a biasing flag near a free end thereof; and wherein
(b) said trigger lever is rotatable in a horizontal plane and said device including a spring biasing mechanism continuously urging said trigger lever into a preset position relative to said restraining bar such that when a fisherman sets said device, it is possible to push downwardly on said restraining bar so that said flag first engages and biases said lever to the side of said restraining bar, thereafter said bar is pushed by the user downwardly past and below said lever whereupon said spring biasing mechanism returns said lever to the preset position thereof such that said lever is then located over said bar and thereafter said bar is released and allowed to raise and re-engage the underside of said trigger lever so that said device is in the set configuration thereof.

8. The device according to claim 7 wherein:
(a) said restraining bar is pivotally mounted on a first support post;
(b) said trigger lever is mounted on a second support post to rotate in a plane perpendicular to said second support post; and
(c) said first and second support posts are mounted on a support plate such that said lever and said restraining bar are spaced from said plate when said device is in the set configuration thereof.

9. The device according to claim 8 wherein:
(a) said first and second support posts are adjustable relative to said support plate to vary the vertical distance of said restraining bar and lever from said plate when said device is in the set configuration thereof.

10. The device according to claim 9 including:
(a) a second plate mounted above and parallel to said support plate and connected with said support plate by connecting means so as to be reciprocable in a vertical direction and so as to be normally biased upwardly and away from said support plate; said second plate adapted to receive the pole thereon; and
(b) a guide attached to and reciprocating with said second plate and including guide arms for directing said restraining bar into the set configuration thereof.

11. The device according to claim 8 including:
(a) alarm means cooperating with said triggering mechanism to signal to a user that said device has gone from the set configuration to the triggered configuration thereof.

12. The device according to claim 11 wherein said alarm means comprises a light source.

13. A fishing pole holder and hook setter for use with a fishing pole having a handle end, a tip end and a rod mounted therebetween with a fishing line extending along the rod and from the tip end; said fishing pole holder comprising;
(a) an upright support post adapted to be secured to a support medium;
(b) a pole handle receiving receptacle for receiving the fishing pole and being hingedly connected to the top of the upright support post by a coil biasing spring, the range of said spring allowing the pole rod to rotate between generally vertical and horizontal positions when the pole is mounted in said receiving receptacle;

(c) an elongate support member pivotally connected to the upright support member near one end thereof; said support member extending generally in a horizontal direction when operably positioned;

(d) a pole hold down and triggering mechanism connected to said support member opposite said support post; said triggering mechanism comprising:

(1) a swingable plate member pivotally connected to said support member; said plate member being adjustable in angular relationship to said support member;

(2) first and second upright post members positioned respectively on opposite ends of said swingable member and vertically adjustable relative to said swingable member; said first post member being inboard and pivotally attaching said swingable member to said support member;

(3) a constraining bar having a first position wherein said device is in a set configuration in position to catch fish and a second triggered position wherein said constraining bar releases said fishing pole allowing said pole to raise to the triggered configuration thereof consequently causing the fishing line to be sharply pulled so as to set a hook on the line in a fish; said constraining bar extending substantially laterally to said support member when said constraining bar is in the set configuration; an inboard end of said constraining bar being interconnected to said first post; a trip lever deflector flag being connected to outboard end of said constraining bar and directed generally downward when said device is in the set configuration;

(4) a pole positioning plate extending generally laterally to said support member and above said support plate; said positioning plate being connected from beneath to a guide shaft such that said guide shaft slides through a sleeve positioned intermediately along said support plate; said positioning plate being biased by spring means to a preset position opposing upward or downward motion;

(5) a constraining bar guide adjustably connected to inboard end of said positioning plate; an upper end of said constraining bar guide being V-shaped to receive said constraining bar and a lower end of said constraining bar guide having a stem extending through said positioning plate and said support plate;

(6) a switch device positioned to engage said bar guide such that when said device is in the triggered configuration thereof, trigger means of said switch are engaged so as to activate said switch;

(7) a signaling device electrically connected to said switch; said signaling device having an electrical circuit energized by an electrical power source and cooperating with said switch to be activated selectively by a user and alternatively by said switch when said device is in the triggered configuration thereof;

(8) an elongate trip lever pivotally connected to the upper end of said outboard post member by a ball bearing mounting; said lever being divided by said mounting into an outward segment adapted to engage the fishing line and a constraining bar engaging segment; biasing means is connected to said pivot lever and biases said lever into a predetermined home position; said outward segment having an adjustable fishing line engagement means which may be selectively positioned along the length of said outward segment to vary the pull required to trip said lever;

(e) locking means associated with said receptacle for removably locking the pole handle in said receptacle; and (f) a hook mechanism adjustably positionable along said support member and including a hook selectively being positionable over the fishing pole to prevent accidental injury to a user if triggered while setting and to function as a position stop for the pole.

14. In a fishing device including a support structure for holding a fishing pole with a fishing line in a set configuration and a triggered configuration and further including biasing means urging the pole from the set configuration to the triggered configuration but being restrained by a trigger mechanism until the triggering mechanism is tripped and further wherein the triggering mechanism includes a restraining bar, held in covering relation to the pole when in the set configuration, by a trigger lever engaging the restraining bar at one end thereof and said lever being rotatable by pressure exerted on an opposite end thereof by a fish pulling on the fishing line looped over said lever so as to rotate to a triggered position whereupon the lever no longer covers the restraining bar so as to release the bar and allow the pole to swing to the triggered configuration; the improvement wherein:

(a) said device includes adjustment means allowing the tension required to rotate said lever to be modified; and including (b) an elongate support member aligned parallel with the pole when said device is in the set configuration thereof; and (c) said elongate member having mounted thereon a hook mechanism adapted to be selectively positioned in securing relationship over the pole for protection of the user and for functioning as a stop to limit upward movement of the pole; said hook mechanism comprising:

(d) a slide adjustably movable and lockable along said support member;

(e) a height adjustment post mounted on said slide;

(f) a hook adapted to be placed over said pole; and (g) a dampening spring connecting said hook to said adjustment post.

15. In a fishing device including a support structure for holding a fishing pole with a fishing line in a set configuration and a triggered configuration and further including biasing means urging the pole from the set configuration to the triggered configuration but being restrained by a trigger mechanism until the triggering mechanism is tripped and further wherein the triggering mechanism includes a restraining bar, held in covering relation to the pole when in the set configuration, by a trigger lever engaging the restraining bar at one end thereof and said lever being rotatable by pressure exerted on an opposite end thereof by a fish pulling on the fishing line looped over said lever so as to rotate to a triggered position whereupon the lever no longer covers the restraining bar so as to release the bar and allow the pole to swing to the triggered configuration; the improvement wherein:

(a) said device includes adjustment means allowing the tension required to rotate said lever to be modified;
(b) said adjustment means comprises an adjustable slide on said trigger lever adapted for receiving the fishing line looped thereover; said slide being selectively and infinitely positionable along said trigger lever so as to modify the leverage required to rotate said trigger lever relative to said restraining bar.

16. In a fishing device including a support structure for holding a fishing pole with a fishing line in a set configuration and a triggered configuration and further including biasing means urging the pole from the set configuration to the triggered configuration but being restrained by a trigger mechanism until the triggering mechanism is tripped and further wherein the triggering mechanism includes a restraining bar, held in covering relation to the pole when in the set configuration, by a trigger lever engaging the restraining bar at one end thereof and said lever being rotatable by pressure exerted on an opposite end thereof by a fish pulling on the fishing line looped over said lever so as to rotate to a triggered position whereupon the lever no longer covers the restraining bar so as to release the bar and allow the pole to swing to the triggered configuration; the improvement wherein said device includes:
(a) an elongate support member secured to said support structure and not rotating with the pole from a set configuration to a triggered position thereof; said support member being aligned generally parallel with the pole when said device is in the set configuration thereof; and
(b) said elongate member having mounted thereon a hook mechanism not rotating with the pole and being adapted to be selectively positioned in securing relationship over the pole for protection of the user and for functioning as a stop t limit upward movement of the pole.

17. In a fishing device including a support structure for holding a fishing pole with a fishing line in a set configuration and a triggered configuration and further including biasing means urging the pole from the set configuration to the triggered configuration but being restrained by a trigger mechanism until the triggering mechanism is tripped and further wherein the triggering mechanism includes a restraining bar, held in covering relation to the pole when in the set configuration, by a trigger lever engagin the restraining bar at one end thereof and said lever being rotatable by pressure exerted on an opposite end thereof by a fish pulling on the fishing line looped over said lever so as to rotate to a triggered position whereupon the lever no longer covers the restraining bar so as to release the bar and allow the pole to swing to the triggered configuration; the improvement wherein; said device includes:
(a) a telescoping mechanism pivotally connected to said device and near whereat said device is adapted to hold a handle of said pole and being extendable therefrom and including means thereon to attach to a pole to provide rigidity thereto or to alternatively function as a pole.

* * * * *